United States Patent Office 3,775,482
Patented Nov. 27, 1973

3,775,482
PREPARATION OF TERTIARY PHOSPHINES
Warren Hewertson and Ian Charles Taylor, Runcorn, England, assignors to Imperial Chemical Industries Limited, London, England
No Drawing. Continuation of abandoned application Ser. No. 92,193, Nov. 23, 1970. This application May 22, 1972, Ser. No. 255,708
Claims priority, application Great Britain, Nov. 24, 1969, 57,393/69; Aug. 14, 1970, 39,278/70
Int. Cl. C07f 9/50
U.S. Cl. 260—606.5 P  12 Claims

ABSTRACT OF THE DISCLOSURE

Process for the preparation of alkali metal organic phosphides, which are useful as intermediates in the preparation of tertiary phosphines. Preferably the intermediate phosphide is not isolated from the reaction mixture, which is further treated, in situ, with an appropriate organic halide to produce the required tertiary phosphine.

---

This is a continuation of application Ser. No. 92,193, filed Nov. 23, 1970, and now abandoned.

This invention relates to the production of alkali metal phosphides by cleavage of diphosphines, and also to the production therefrom of tertiary phosphines.

It has been proposed to prepare alkali metal phosphides by cleaving tetra-alkyl diphosphines by reaction with an alkali metal. The alkali metal phosphides produced can be subsequently reacted with a hydrocarbyl halide to give a tertiary phosphine and the appropriate alkali metal halide.

The cleavage reaction is slow, and, in order to obtain reasonable rates of reaction, it is necessary to use a large excess of alkali metal, normally in conjunction with high temperatures. If solvents such as tetrahydrofuran are used, at reflux temperatures, the phosphide may react with the solvent, thus reducing yields of product. With other solvents, such as liquid ammonia, yields of ditertiary phosphines from the reaction of product phosphide with hydrocarbyl dihalide may be low.

According to the present invention, we provide a process for the preparation of organic phosphides in which a liquid solution of an organic diphosphine is treated with an alkali metal in the presence of an aromatic compound capable of reversibly accepting electrons.

It is a feature of our invention that it is possible for reaction to occur at ambient temperature with stoichiometric amounts of alkali metal, thereby minimising reaction of the product phosphide with the solvent and simplifying subsequent work-up procedures.

The substituent groups of the initial diphosphine may be the same or different, although, in order to obtain one product only, it is preferred to use a symmetrically substituted diphosphine. Preferably, all four substituents of the diphosphine are hydrocarbyl groups. Particularly suitable starting materials are tetra-alkyl diphosphines, especially tetramethyl and tetraethyl diphosphines. The starting material can be dissolved in any suitable inert solvent, such as diethyl ether or dioxane. A particularly convenient solvent is tetrahydrofuran.

The alkali metal, preferably in a form having a large surface area/weight ratio, such as flakes, may be stirred into the solution of organic diphosphine, or the starting material may be added to a stirred mixture of alkali metal and solvent. A convenient alkali metal is lithium, but sodium and potassium are also effective.

The aromatic compound capable of reversibly accepting electrons is preferably a fused ring polynuclear aromatic hydrocarbon, for example naphthalene, anthracene, or phenanthrene. Diphenyl is also effective, and is readily available. The amount of aromatic compound used as catalyst is not critical. For reasons of convenience, amounts should be kept low, and a suitable amount of catalyst is about 2–5 mole percent calculated on alkali metal content.

Since both organic diphosphines and alkali metals are susceptible to oxidation and hydrolysis, the reaction should be conducted in a dry, oxygen-free environment. This is conveniently achieved by drying all materials and by working in an atmosphere of dry, oxygen-free nitrogen.

It is possible to prepare the organic diphosphine in situ, for example from a substituted monohalophosphine. In such a case, it is necessary to use an excess of alkali metal over that required to form the organic phosphide. It is not, however, necessary to use more alkali metal than is indicated by the stoichiometry of the two reactions, that is, the formation of the diphosphine and the production of the phosphide.

The product metal phosphides are useful organic reagents and are particularly useful for the preparation of tertiary phosphines by reaction with an organic halide, thus eliminating alkali metal halide.

Thus, according to a further aspect of the present invention, we provide a process for the production of tertiary phosphines in which a liquid solution of an organic diphosphine, preferably a tetraalkyldiphosphine, is treated with an alkali metal in the presence of an aromatic compound capable of reversibly accepting electrons, and the reaction product is treated with an organic halide.

It is not necessary that the organic phosphide be isolated before reaction with the halide, and it is preferable to form the tertiary phosphine without isolation of the intermediate phosphide.

The substituent groups of the organic halide may be saturated or unsaturated, aliphatic or aromatic. Thus alkyl, alkenyl, alkynyl, aryl, alkaryl, aralkyl or alicyclic halides may all be used, depending on the desired structure of the product tertiary phosphine. The organic group may also bear incidental, inert substituents, provided that these do not interfere with the formation of the tertiary phosphine.

The organic halide may contain more than one halogen atom, the product phosphine having one phosphorus atom for each halogen atom present in the organic halide.

Organic chlorides react particularly readily, and are therefore preferred.

It will be apparent that the structure of the product phosphine will be dependent on the substituent groups of the initial diphosphine, and also on the nature of the organic halide.

Depending on the relative stability of the possible isomers, rearrangements of substituent groups may occur during reaction of the organic halide with the metal phosphide. Such rearrangement is equally included within the scope of our invention.

Reaction products may be isolated by conventional means, for example by distillation or by precipitation with a non-solvent for the required product, for example petrol.

If it is desired to minimise the amount of residual aromatic hydrocarbon in the product tertiary phosphine, a preferred method of isolation comprises the steps of (1) acidifying the reaction mixture so as to obtain a water-soluble phosphonium salt,
(2) extracting the mixture with water and a water-immiscible organic solvent in which the aromatic compound is soluble, and
(3) regenerating and separating the tertiary phosphine from aqueous solution.

The invention is illustrated by the following examples, in which yields of products are given as mole percent of theoretical yields calculated on the basis of initial starting material.

All reactions were performed under dry, oxygen-free nitrogen, and solvent tetrahydrofuran was dried by distillation from sodium-diphenylketyl. Diethyl ether and water (used for extraction of products) were degassed by bubbling nitrogen through them for about an hour before use.

EXAMPLE 1

A mixture was made up of freshly cut lithium flakes in tetrahydrofuran (0.56 gram atom of lithium per litre of tetrahydrofuran). This mixture was stirred and 0.28 mole of tetraethyl diphosphine and 0.032 mole of naphthalene (5.7 mole percent on lithium) were added per litre of tetrahydrofuran. The reaction mixture turned dark green over a period of 10 minutes.

After 15 hours stirring at ambient temperature, almost all the lithium had reacted, and the remainder was consumed after a further 3 hours at 30° C. The reaction solution contained lithium diethylphosphide, which was isolated from a sample of the solution by evaporating off the tetrahydrofuran and washing the residue with a hydrocarbon solvent, for example, petrol, to remove the naphthalene. Alternatively, the phosphide could have been isolated by evaporating off some of the tetrahydrofuran and precipitating the lithium diethylphosphide by addition of petrol to the mixture. However, since it is not necessary to isolate the product phosphides if they are to be used merely as intermediates, for example in the preparation of tertiary phosphines, the remainder of the reaction mixture was treated as described below to produce the required tertiary phosphine. In the remaining examples the step of isolating the intermediate phosphide is not specifically referred to; but, should one wish to do so, this could be readily accomplished, for example by the use of one of the techniques described above.

The mixture was cooled to 0° C. and, over a period of 10 minutes, 0.56 mole of 4-chloro-but-1-ene per litre of solution (as a 14 M solution in tetrahydrofuran) was added dropwise. The colour of the reaction mixture turned from green to orange, and progressively paled to a cream colour.

The tetrahydrofuran was removed by evaporation in vacuo and the residue was washed with water free of gaseous oxygen and extracted six times with diethyl ether. The ethereal fraction was dried over anhydrous sodium sulphate and the ether was removed by distillation. The residual liquid was purified by distillation to give diethyl-3-butenyl phosphine (B.P. 26–27° C. at 0.4–0.5 mm.) in 67% yield.

EXAMPLE 2

The procedure of Example 1 was repeated with the exception that the chlorobutene was replaced by an equivalent amount of p-methoxychlorobenzene.

The product was diethyl-p-methoxyphenylphosphine (B.P. 130–131° C. at 10 mm.).

EXAMPLE 3

A mixture was made up of lithium flakes in tetrahydrofuran (1.6 gram atoms of lithium per litre). This was stirred at 0° C. and 0.8 mole of diethylchlorophosphine was added per litre of tetrahydrofuran. After completion of reaction 0.04 mole of naphthalene was added per litre of tetrahydrofuran, whereupon the reaction mixture turned dark green.

The reaction mixture was allowed to warm up to ambient temperature and was stirred for 2 hours, when nearly all the lithium was consumed, the remainder being consumed after leaving the reaction mixture overnight.

The reaction mixture was cooled to −40° C. and 0.8 mole of allyl chloride per litre of solution was added (as a 20 M solution in tetrahydrofuran). The reaction mixture turned orange and then paled.

Work-up as in Example 1 gave diethyl allyl phosphine (B.P. 69–72° C. at 50 mm.) in 73.5% yield.

EXAMPLE 4

A mixture was up of lithium flakes in tetrahydrofuran (0.68 gram atom of lithium per liter). 0.34 mole of tetramethyl diphosphine was added per litre of tetrahydrofuran, followed by 5 mole percent (on lithium) of diphenyl. The reaction mixture became a deep bluish-green.

The mixture was stirred at ambient temperature overnight, when all the lithium was consumed. The mixture was cooled to −40° C. and 0.34 mole of trans-1,4-dichloro-but-2-ene per litre of solution was added (as an 8.5 M solution in tetrahydrofuran).

Work-up as in Example 1 gave trans-1,4-bis-(dimethylphosphino)-but-2-ene (B.P. 81–84° C. at 8–9 mm.) in 55% yield.

EXAMPLE 5

A mixture was made up of lithium flakes and tetrahydrofuran (1.45 gram atoms of lithium per litre). 0.725 mole of tetramethyldiphosphine and 0.04 mole of naphthalene (2.2 mole percent on lithium) were added per litre of tetrahydrofuran.

The reaction mixture was stirred at ambient temperature overnight as in Example 4, and was then cooled to −40° C. 0.725 mole of 1,2-dichloroethane was added per litre of solution (as a 7.25 M solution in tetrahydrofuran).

Work-up as in Example 1 gave 1,2-bis(dimethylphosphino)ethane (B.P. 120–125° at 80 mm.) in 52% yield.

EXAMPLE 6

The procedure of Example 5 was repeated with the exception that dichloroethane was replaced by ethyl chloride (1.45 moles per litre).

The product was dimethylethylphosphine (B.P. 83–85° C.).

EXAMPLE 7

The procedure of Example 5 was repeated with the exception that dichloroethane was replaced by chlorobenzene (1.45 moles per litre).

The product was dimethylphenylphosphine (B.P. 83–84° C. at 13.5 mm.).

EXAMPLE 8

The procedure of Example 5 was repeated with the exception that dichloroethane was replaced by cyclohexyl chloride (1.45 moles per litre).

The product was diethylcyclohexylphosphine.

EXAMPLE 9

The procedure of Example 5 was repeated with the dichloroethane replaced by 1-chlorobut-2-yne.

The product was dimethyl-2-butyryl-phosphine.

EXAMPLE 10

A mixture was made up of lithium flakes and naphthalene in dry tetrahydrofuran (1.624 gram atoms of lithium and 0.08 mole of naphthalene per liter of tetrahydrofuran). To this were added 0.812 mole of tetramethyldiphosphine per litre of tetrahydrofuran. The mixture was stirred overnight at ambient temperature. The mixture was then cooled to −40° C. and 0.812 mole of 1,2-dichloroethane per litre of reaction mixture was added dropwise over a period of 15 minutes (as a 10 M solution in tetrahydrofuran). The mixture was allowed to warm up to ambient temperature and the tetrahydrofuran was removed by distillation at atmospheric pressure. The residue was stirred with a mixture of water, diethyl ether and concentrated hydrochloric acid (2:1:0.4 by volume) for 10 minutes, the acid being in slight excess over the amount of phosphine theoretically present. The ethereal layer was then discarded and replaced by fresh ether. The mixture was neutralised with 8 N aqueous sodium hydroxide and the ethereal layer separated. The aqueous layer was extracted four times with diethyl ether and the washings were combined with the above ethereal layer. This ethereal solution was dried over anhydrous sodium sulphate and distilled to give 1,2-bis(dimethyl-phosphino)ethane (B.P. 75–79° C. at 2 mm.) in 56% yield. There was no indication of naphthalene in the H nuclear magnetic spectrum of the product.

What we claim is:

1. A process for the preparation of an organic phosphide which comprises contacting at ambient temperature a tetrahydrocarbyl diphosphine and a stoichiometric proportion of alkali metal in tetrahydrofuran and then isolating the phosphide thus produced from the reaction mixture, the contact between said diphosphine and alkali metal being carried out in the presence of a catalytically effective amount of a fused ring polynuclear aromatic hydrocarbon or diphenyl.

2. A process according to claim 1 wherein the fused ring polynuclear aromatic hydrocarbon or diphenyl is present in an amount of at least 2 mol percent, calculated on the alkali metal content.

3. A process according to claim 1 wherein the fused ring polynuclear aromatic hydrocarbon or diphenyl is present in an amount of 2–5 mol percent, calculated on the alkali metal content.

4. A process according to claim 1 wherein the tetrahydrocarbyl diphosphine is a tetra-alkyl diphosphine.

5. A process according to claim 1 wherein tetraethyl disphosphine or tetramethyl diphosphine and lithium are contacted in tetrahydrofuran in the presence of a catalytic amount of naphthalene or diphenyl to form an organic phosphide.

6. A process for the preparation of a tertiary phosphine which comprises contacting at ambient temperature a tetrahydrocarbyl diphosphine and a stoichiometric proportion of alkali metal in tetrahydrofuran, the contact between said diphosphine and alkali metal being carried out in the presence of a catalytically effective amount of a fused ring polynuclear aromatic hydrocarbon or diphenyl, and then contacting the resulting reaction mixture with an organic halide to form said tertiary phosphine.

7. A process according to claim 6 wherein tetraethyl diphosphine or tetramethyl diphosphine and lithium are contacted in tetrahydrofuran in the presence of a catalytic amount of naphthalene or diphenyl to form an organic phosphide, and the resutling reaction mixture containing said phosphide is then contacted with a chlorobutene, methoxychlorobenzene, allyl chloride, dichloroethane, ethyl chloride, chlorobenzene or cyclohexyl chloride to form said tertiary phosphine.

8. A process according to claim 1 in which the fused ring polynuclear aromatic compound is selected from the group consisting of naphthalene, anthracene and phenanthrene.

9. A process according to claim 6 in which the aromatic hydrocarbon is present in an amount of 2 through 5 mole percent, calculated on alkali metal content.

10. A process according to claim 6 in which the organic halide is selected from the group consisting of alkyl, alkenyl, alkynyl, aryl, alkaryl, aralkyl, and alicyclic halides.

11. A process according to claim 10 in which the organic halide is an organic chloride.

12. A process for the preparation of tertiary phosphines according to claim 6 in which, after completion of reaction, the product phosphine is isolated from the reaction mixture by a process which comprises the steps of
(1) acidifying the reaction mixture so as to obtain a water-soluble phosphonium salt,
(2) extracting the mixture with water and a water-immiscible organic solvent in which the aromatic compound is soluble, and
(3) regenerating and separating the tertiary phosphine from aqueous solution.

References Cited
UNITED STATES PATENTS 3,652,678    3/1972    Allum et al. _____ 260—606.5 P WERTEN F. W. BELLAMY, Primary Examiner